(12) United States Patent
Bickham et al.

(10) Patent No.: US 7,929,818 B1
(45) Date of Patent: Apr. 19, 2011

(54) LARGE EFFECTIVE AREA FIBER WITH GRADED INDEX GE-FREE CORE

(75) Inventors: Scott Robertson Bickham, Corning, NY (US); Rostislav Radievich Khrapko, Corning, NY (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/827,333

(22) Filed: Jun. 30, 2010

(51) Int. Cl.
*G02B 6/028* (2006.01)

(52) U.S. Cl. ...................................................... 385/124

(58) Field of Classification Search .................. None
See application file for complete search history.

(56) References Cited

U.S. PATENT DOCUMENTS

| | | | |
|---|---|---|---|
| 6,600,862 B2 | 7/2003 | Mukasa | 385/124 |
| 6,658,190 B2 | 12/2003 | Hirano et al. | 385/124 |
| 7,536,076 B2 | 5/2009 | Khrapko et al. | 385/142 |
| 7,689,085 B1 | 3/2010 | Mishra | 385/127 |
| 2009/0263092 A1* | 10/2009 | Flammer et al. | 385/127 |
| 2010/0027951 A1* | 2/2010 | Bookbinder et al. | 385/127 |
| 2010/0284659 A1* | 11/2010 | Nicholson et al. | 385/127 |

* cited by examiner

*Primary Examiner* — Sung H Pak
(74) *Attorney, Agent, or Firm* — Svetlana Z. Short

(57) ABSTRACT

According to some embodiments an optical waveguide fiber comprises (i) a Ge free core having an effective area of 100 $\mu m^2$ to 150 $\mu m^2$, at 1550 nm wavelength, said core comprising: a) a central core region extending radially outwardly from a centerline to a radius $r_1$, and having a relative refractive index percent profile $\Delta_1(r)$ in % measured relative to pure silica, wherein $-0.1\% \leq \Delta_1(r) \leq 0.12\%$, wherein the central core region has a maximum relative refractive index percent, $\Delta_{1MAX}$; (b) a first annular core region surrounding and directly adjacent to the central core region, having an α value $1.5 \leq \alpha \leq 10$, and extending to an outer radius $r_2$, wherein 6 $\mu m \leq r_2 \leq 10 \mu m$, and having a relative refractive index percent profile, $\Delta_2(r)$ in % measured relative to pure silica, a minimum relative refractive index $\Delta_{2MIN}$, a maximum relative refractive index $\Delta_{2MAX}$ and the relative refractive index measured at a radius r=2 $\mu m$, wherein $0.45 \leq \Delta_2 \leq 0$; $-0.25 \geq \Delta_{2MIN} \geq -0.45$ and $\Delta_{1MAX} \geq \Delta_2(r=2 \mu m)$; (c) a fluorine doped second annular region surrounding and directly adjacent to the first annular core region and extending to a radius 20 $\mu m \leq r_3 \leq 30 \mu m$ and having a negative relative refractive index percent profile, $\Delta_3(r)$ in %, measured relative to pure silica, with a minimum relative refractive index percent $\Delta_{3MIN}$ and $-0.5\% < \Delta_{3MIN} < -0.25\%$; and $\Delta_{3MIN} \leq \Delta_{2MIN}$; (ii) a cladding surrounding the core and having a relative refractive index percent $\Delta_4(r)$ in % measured relative to pure silica and a minimum refractive index delta $\Delta_{4MIN}$, and $-0.4\% < \Delta_4 < -0.2\%$; wherein the relative refractive index profile of the optical fiber is selected to provide attenuation of no more than 0.17 dB/km at the 1550 nm wavelength.

20 Claims, 3 Drawing Sheets

US 7,929,818 B1

LARGE EFFECTIVE AREA FIBER WITH GRADED INDEX GE-FREE CORE

FIELD OF THE INVENTION

The present invention relates generally to optical fibers, and particularly to large effective area optical fibers with pure silica core and low attenuation.

TECHNICAL BACKGROUND

Optical amplifier technology and wavelength division multiplexing techniques are typically required in telecommunication systems that provide high power transmissions for long distances. The definition of high power and long distances is meaningful only in the context of a particular telecommunication system wherein a bit rate, a bit error rate, a multiplexing scheme, and perhaps optical amplifiers are specified. There are additional factors, known to those skilled in the art, which have impacted upon the definition of high power and long distance. However, for most purposes, high power is an optical power greater than about 10 mW. High power systems often suffer from non-linear optical effects, including self-phase modulation, four-wave-mixing, cross-phase modulation, and non-linear scattering processes, all of which can cause degradation of signals in high powered systems. In some applications, single power levels of 1 mW or less are still sensitive to non-linear effects, so non-linear effects may still be an important consideration in such lower power systems. In addition, other optical fiber attributes, such as attenuation, are a major contributing factor to the degradation of the signal.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems. On the other hand, an increase in effective area of an optical waveguide fiber typically results in an increase in macrobending induced losses which attenuate signal transmission through a fiber. Furthermore, attenuation can be a major contributing factor to the degradation of the signal in large effective area fibers.

SUMMARY

One embodiment of the invention is an optical waveguide fiber comprising:
(i) a Ge free core having an effective area of 100 $\mu m^2$ to 150 $\mu m^2$, at 1550 nm wavelength, said core comprising:
  (a) a central core region extending radially outwardly from a centerline to a radius $r_1$, and having a relative refractive index percent profile $\Delta_1(r)$ in % measured relative to pure silica, wherein $-0.1\% \leq \Delta_1(r) \leq 0.12\%$, wherein the central core region has a maximum relative refractive index percent, $\Delta_{1MAX}$;
  (b) a first annular core region surrounding and directly adjacent to the central core region having an α value $1.5 \leq \alpha \leq 10$, and extending to an outer radius $r_2$, wherein 6 $\mu m \leq r_2 \leq 10$ $\mu m$, and having a relative refractive index percent profile, $\Delta_2(r)$ in % measured relative to pure silica, a minimum relative refractive index $\Delta_{2MIN}$, a maximum relative refractive index $\Delta_{2MAX}$ and the relative refractive index measured at a radius $r=2$ $\mu m$, wherein $-0.45 \leq \Delta_2 \leq 0$; $-0.25 \geq \Delta_{2MIN} \geq -0.45$ and $\Delta_{1MAX} \geq \Delta_2$ ($r=2$ $\mu m$);

(c) a fluorine doped second annular region surrounding and directly adjacent to the first annular core region and extending to a radius 20 $\mu m \leq r_3 \leq 30$ $\mu m$ and having a negative relative refractive index percent profile, $\Delta_3(r)$ in %, measured relative to pure silica, with a minimum relative refractive index percent $\Delta_{3MIN}$ and $-0.5\% < \Delta_{3MIN} < -0.25\%$; and $\Delta_{3MIN} \leq \Delta_{2MIN}$
(ii) a cladding surrounding the core and having a relative refractive index percent $\Delta_4(r)$ in % measured relative to pure silica,
  with a minimum relative refractive index percent $\Delta_{4MIN}$ and $-0.4\% < \Delta_4 < -0.2\%$;
  wherein the relative refractive index profile of the optical fiber is selected to provide attenuation of no more than 0.17 dB/km at the 1550 nm wavelength.

According to some embodiments the relative refractive index profile of the optical fiber is selected to provide attenuation of no more than 0.165 dB/km at the 1550 nm. According to some embodiments the relative refractive index profile of the optical fiber is selected to provide attenuation of no more than 0.16 dB/km or even no more than 0.155 dB/km at the 1550 nm wavelength.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Definitions

Figure 1A:
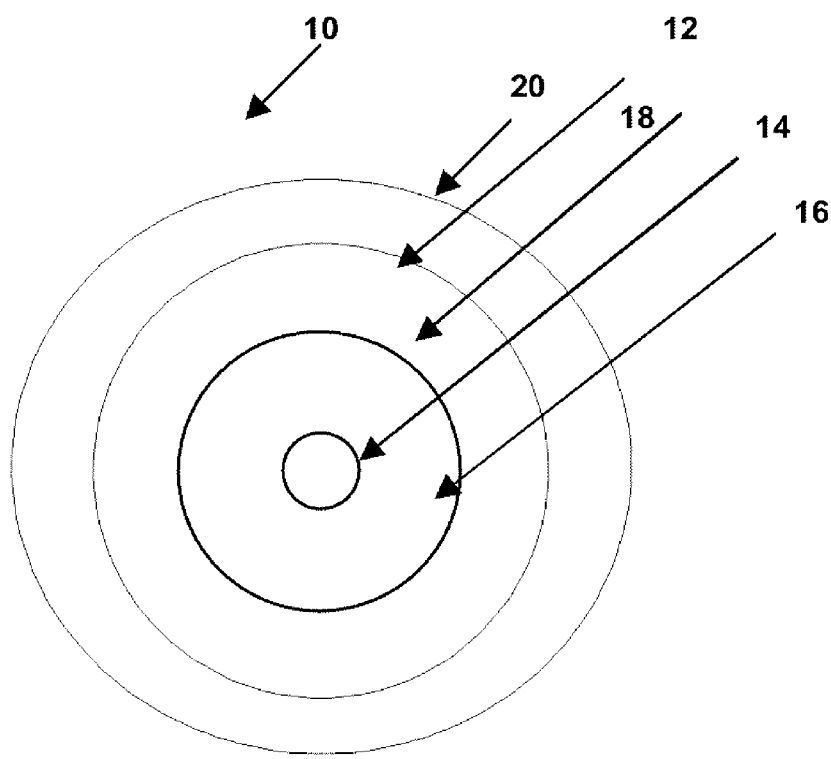
FIG. 1A is a cross-sectional view of one embodiment of the present invention.

The "refractive index profile" is the relationship between refractive index or relative refractive index and waveguide fiber radius.

The "relative refractive index percent" is defined as $\Delta\% = 100 \times (n(r)^2 - n_s^2)/2n(r)^2$, where n(r) refractive index at the radial distance r from the fiber's centerline, unless otherwise specified, and $n_s$ is the refractive index of silica at a wavelength of 1550 nm. As used herein, the relative refractive index is represented by Δ and its values are given in units of "%", unless otherwise specified. In cases where the refractive index of a region is less than that of silica, the relative index percent is negative and is referred to as having a depressed index, and is calculated at the point at which the relative index is most negative unless otherwise specified. In cases where the refractive index of a region is greater than the refractive index silica, the relative index percent is positive and the region can be said to be raised or to have a positive index, and is calculated at the point at which the relative index is most positive, unless otherwise specified. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion values in a two-moded regime assume intermodal dispersion is zero. The zero dispersion wavelength ($\lambda_0$) is the wavelength at which the dispersion has a value of zero. Dispersion slope is the rate of change of dispersion with respect to wavelength.

"Effective area" is defined as: $A_{eff}=2\pi(\int f^2 r\, dr)^2/(\int f^4 r\, dr)$, where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is the radius, which follows the equation, $\Delta(r)=\Delta(r_o)(1-[|r-r_i|/(r_f-r_i)]^\alpha)$ where $r_i$ is the point at which $\Delta(r)$ is maximum, $r_2$ is the point at which $\Delta(r)$ % is minimum, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured or modeled using the Petermann II definition, wherein, 2w=MFD, and $w^2=(2\int f^2 r\, dr/\int [df/dr]^2 r\, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load wire mesh (LLWM) attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement (when using the multimode reference technique), i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cable cutoff" is typically lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cable cutoff measurement is described in EIA-455-170 Cable Cutoff Wavelength of Single-mode Fiber by Transmitted Power, or "FOTP-170" Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Embodiment(s) of the Invention

Figure 1B:
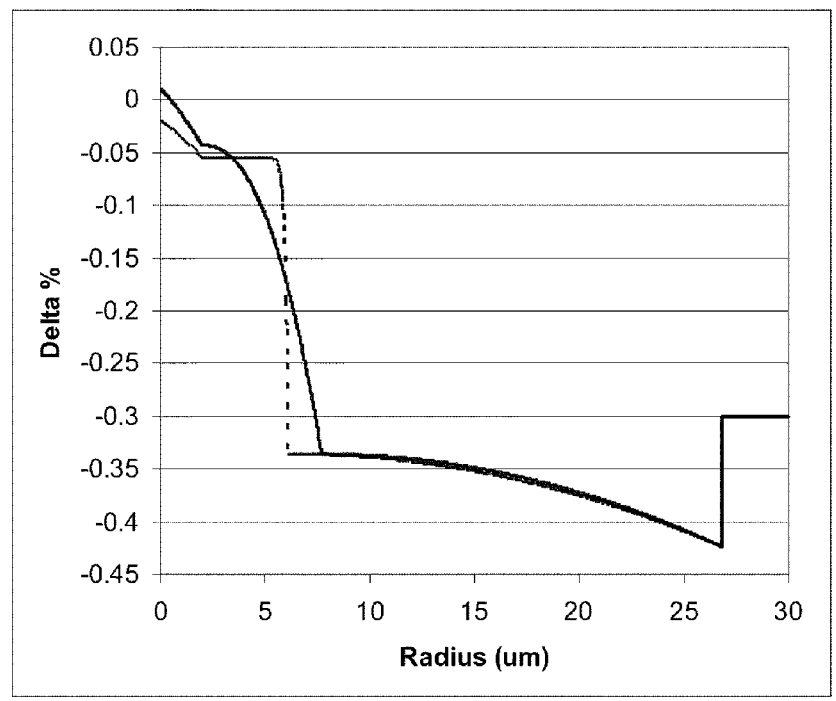
FIG. 1B illustrates schematically an exemplary refractive index profile of the fiber of FIG. 1A (solid line) and a refractive index profile of a comparative fiber (dashed line)

Reference will now be made in detail to the present embodiment(s) of the invention, examples of which are illustrated in the accompanying drawings. Whenever possible, the same reference numerals will be used throughout the drawings to refer to the same or like parts. One embodiment of the optical fiber of the present invention is shown in FIG. 1A, and is designated generally throughout by the reference numeral 10. The waveguide fiber 10 includes a core 12 having an effective area of about 100 µm² or more at a 1550 nm wavelength (for example, 100 µm² to 160 µm², or 105 µm² to 150 µm², or 120 to 140 µm² at a 1550 nm wavelength), and α value $1.5 \leq \alpha \leq 10$, and a cladding 20 surrounding the core. A typical range of α values in the exemplary fibers described herein is 1.5 to 4, for example $1.8 \leq \alpha \leq 3$. The exemplary refractive index profile (relative refractive index delta, vs. radius) of this fiber shown schematically (solid line) in FIG. 1B.

The core 12 is Ge free and comprises a central core region 14, a first annular core region 16 surrounding and directly adjacent to the central core region 14, and a second annular region 18 surrounding and directly adjacent to the first annular region 16. The central core region 14 extends radially outwardly from a centerline to a radius $0 \mu m \leq r_1 \leq 2 \mu m$, and has a relative refractive index percent profile $\Delta_1(r)$ measured in % relative to pure silica, wherein $-0.1\% \leq \Delta_1(r) \leq 0.12\%$ (e.g., $-0.08\% \leq \Delta_1(r) \leq 0.1\%$). In some embodiments $-0.06\% \leq \Delta_1(r) \leq 0.06\%$. The central core region 14 also has a maximum relative refractive index percent, $\Delta_{1MAX}$. In the exemplary embodiments described herein, $\Delta_{1MAX}$ occurs at the centerline of the fiber (r=0).

The first annular core region 16 has an α value $1.5 \leq \Delta \leq 10$ (for example $2 \leq \alpha \leq 8$, or $1.5 \leq \Delta \leq 6$, $1.5 \leq \Delta \leq 4.5$, or $2 \leq \Delta \leq 4$, or $2 \leq \Delta \leq 3.5$), and extends to an outer radius $r_2$, wherein $6 \mu m \leq r_2 \leq 10 \mu m$, preferably $7 \mu m \leq r_2 \leq 10 \mu m$, more preferably $7.5 \mu m \leq r_2 \leq 9 \mu m$. The first annular core region 16 also has a relative refractive index percent profile, $\Delta_2(r)$ in % measured relative to pure silica, a minimum relative refractive index, $\Delta_{2MIN}$, and a maximum relative refractive index $\Delta_{2MAX}$, (where $\Delta_{1MAX} \geq \Delta \Delta_{2MAX}$), and the relative refractive index $\Delta_2$ measured at a radius r=2 µm is: (a) $-0.15 \leq \Delta_2(r=2 \mu m) \leq 0.1$, and (b) $\Delta_{1MAX} \geq \Delta_2(r=2 \mu m)$. In some embodiments $-0.08 \leq \Delta_2(r=2 \mu m) \leq 0.1$, or $-0.15\% \leq \Delta_2(r=2 \mu m) \leq 0$. In some embodiments $\Delta_{2MAX} = \Delta_2(r=2 \mu m)$. In some embodiments $-0.45\% \leq \Delta_{2MIN} \leq -0.25\%$, for example $-0.4\% \leq \Delta_{2MIN} \leq -0.3\%$, or $-0.45\% \leq \Delta_{2MIN} \leq -0.3\%$.

The second annular core region 18 is fluorine doped, and it surrounds and is directly adjacent to the first annular region 16. Typically, according to the embodiments described herein, second annular core region 18 has 0.4 to 2 wt % fluorine, e.g., 0.4 to 1.6 wt %, or 0.8% to 1.6 wt % fluorine The second annular core region 18 extends to a radius $r_3$, where $15 \mu m \leq r_3 \leq 31 \mu m$ (for example, $20 \mu m \leq r_3 \leq 30 \mu m$ or $25 \mu m \leq r_3 \leq 29.5 \mu m$) and has a negative relative refractive index percent profile, $\Delta_3(r)$ in %, measured relative to pure silica. The minimum relative refractive index percent $\Delta_{3MIN}$ is: (a) $\Delta_{3MIN} < \Delta_2(r=2 \mu m)$ and $\Delta_{3MIN} \leq \Delta_{2MIN}$; and (b) $-0.5\% \leq \Delta_{3MIN} < -0.25\%$. For example, in some embodiments, $-0.5\% \leq \Delta_{3MIN} < -0.3\%$. In at least some embodiments $\Delta_3(r)$ also has a maximum relative refractive index percent $\Delta_{3MAX}$ wherein $\Delta_{3MAX} \geq \Delta_{3MIN}$. In some preferred embodiments $-0.45\% \leq \Delta_{3MIN} < -0.3\%$, and in other preferred embodiments $-0.4\% < \Delta_{3MIN} < -0.3\%$. For example, $\Delta_{3MIN}$ may be $-0.27\%$, $-0.28\%$, $-0.29\%$, $-0.3\%$, $-0.35\%$, $-0.38\%$, $-0.4\%$, $-0.42\%$, or any number there between. It is noted that in at least some embodiments: $\Delta_{3MAX} = \Delta_3(r=r_2) = \Delta_{2MIN}$, and $-0.45\% \leq \Delta_3(r=r_2) \leq -0.3\%$.

It is noted that in cases where second annular core region 18 has a relatively flat refractive index profile, $\Delta_{3MAX} - \Delta_{3MIN} < 0.03\%$, the radius $r_3$ is defined to correspond to the beginning of the cladding 20. In some exemplary the annular core region 18 reaches $\Delta_{3MIN}$ value at the radius $r_3$, just before the beginning of the cladding 20.

In some embodiments the ratio $r_2/r_1$ is between 3 and 5. Preferably, the ratio $3.5 \leq r_2/r_1 \leq 4.5$. Preferably $r_2 \leq 10 \mu m$ and $r_3 \leq 35 \mu m$. In some embodiments $r_3 \leq 30 \mu m$, for example $20 \mu m \leq r_3 \leq 29 \mu m$. In some embodiments the ratio $2.5 \leq r_3/r_2 \leq 5$ (or $0.2 \leq r_2/r_3 \leq 0.4$), for example, $2.7 \leq r_3/r_2 \leq 4.5$ (or $0.22 \leq r_2/r_3 \leq 0.37$).

The cladding 20 surrounds the core 12 and has a relative refractive index percent, $\Delta_4(r)$ in %, measured relative to pure silica, and $\Delta_4(r) \geq \Delta_{3MIN}$. In some exemplary embodiments $\Delta_4(r) \geq \Delta_{3MAX}$. In some exemplary embodiments $\Delta_4(r) \geq \Delta_{3MAX}$. The cladding 20 preferably has a minimum relative refractive index percent $\Delta_{4MIN}$, wherein $-0.4\% < \Delta_{4MIN} < -0.2\%$. In some exemplary embodiments the core 12 and the cladding 20, include F as a downdopant. In these embodiments the F amount present in the first and second annular core regions 16 and 18 is greater than the amount of fluorine present in the central core region 14. Preferably, the amount of F in the core regions 16 and 18 increases with the increased radius. Preferably, the F concentration may increase from 0.1 to 2.0 wt %, more preferably from 0.1 to 1.6% wt. %, for example from 0.2 to 1.6 wt. %. In some embodiments the optical fiber has more than 500 ppm of fluorine in the core and more than 5000 ppm of fluorine in the cladding.

In some exemplary embodiments the core 12 also includes at least one alkali metal oxide dopant, for example, where in the alkali is K, Na, Li, Cs, and, Rb. In some exemplary embodiments the core 12 contains $K_2O$ in the amounts of 20 ppm to 1000 ppm by weight % of K, more preferably between 50-500 ppm wt % of K, and most preferably between 50-300 ppm wt % of K. Fiber 10 may also include chlorine. It is preferable that the amount of chlorine is less than 1500 ppm by wt % in the core 12, and less than 500 ppm by wt % in the cladding 20. It is noted that the term "ppm", unless otherwise specially noted otherwise, refers to parts per million by weight, or ppm by weight, and a measurement on wt % can be converted to ppm by multiplying by a factor of 10,000.

The relative refractive index profile of the optical fiber 10 is selected to provide attenuation of no more than 0.17 dB/km at the wavelength λ of 1550 nm, for example 0.145 dB/km to 0.17 dB/km at the wavelength λ of 1550 nm, more preferably from 0.145 to 0.165 dB/km, most preferably from 0.145 to 0.160 dB/km. The attenuation values can be, 0.15 dB/km to 0.17 dB/km, or 0.145 dB/km to 0.165 dB/km, or, for example: 0.149 dB/km; 0.15 dB/km, 0.152 dB/km; 0.153 dB/km; 0.155 dB/km, 0.158 dB/km, 0.16 dB/km, 0.162 dB/km; 0.165 dB/km, 0.168 dB/km, or 0.17 dB/km at the wavelength λ of 1550 nm. In at least some embodiments, dispersion D at a wavelength of 1550 nm is $19 \leq D \leq 23$ ps/nm/km and in at least some embodiments the fibers have a zero dispersion wavelength $\lambda_0$, and $1260 nm \leq \lambda_0 \leq 1290 nm$. In some embodiments $20 ps/nm/km \leq D \leq 23 ps/nm/km$, $1260 nm \leq \lambda_0 \leq 1290 nm$ and macrobend loss at 1550 nm is less than 1 dB/turn on a 20 mm diameter mandrel. In at least some embodiments the fiber has an effective area Aeff>120 µm² and the relative refractive index profile of the optical fiber is structured to provide dispersion at 1550 nm that is less than 22 ps/nm/km.

The invention will be further clarified by the following examples.

Figure 2:
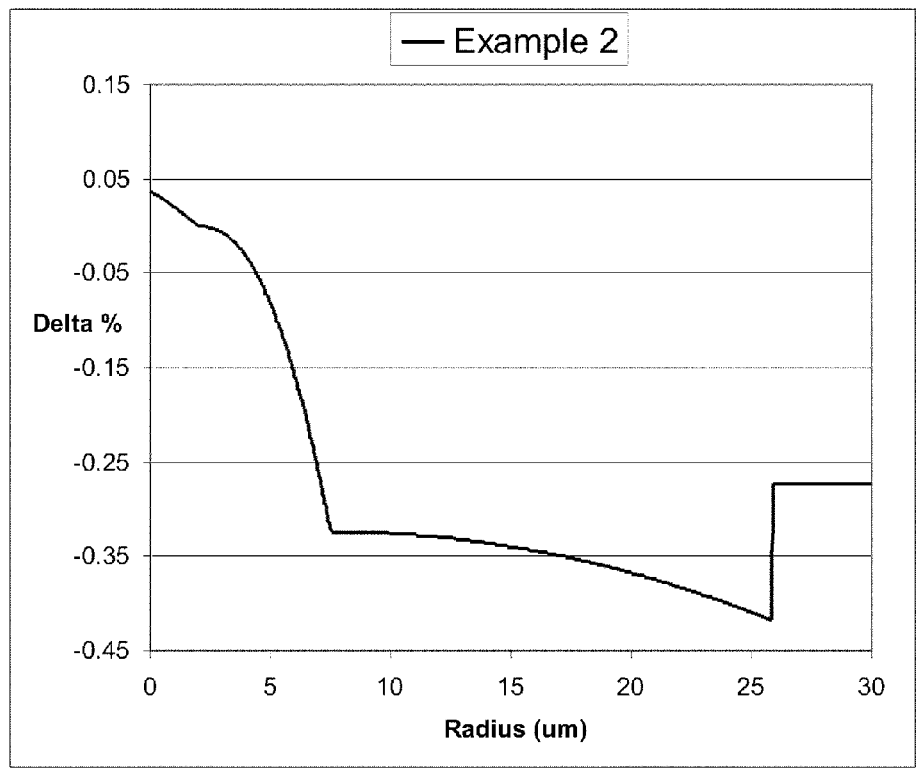
FIGS. 2-4 illustrate refractive index profiles of exemplary embodiments of the optical fibers of the present invention.
Figure 3:
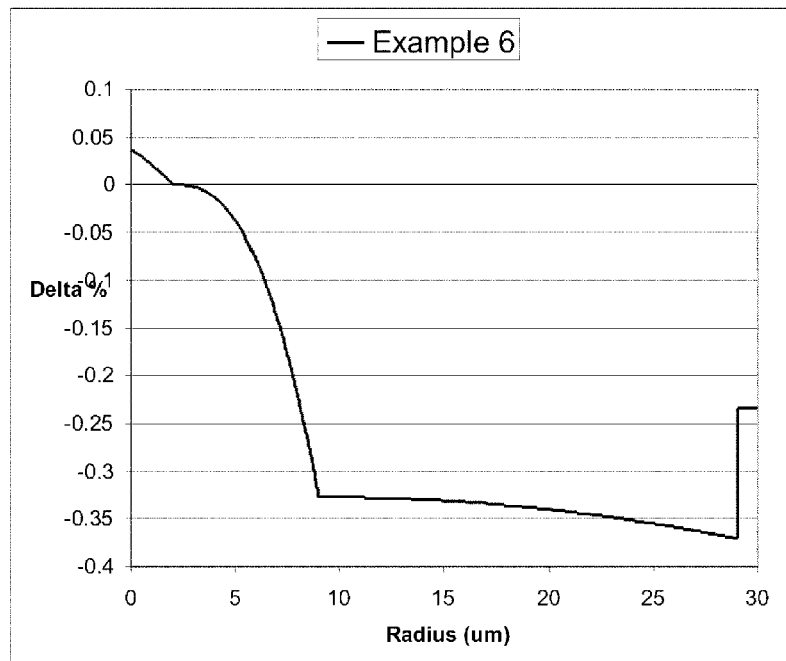
Figure 4:
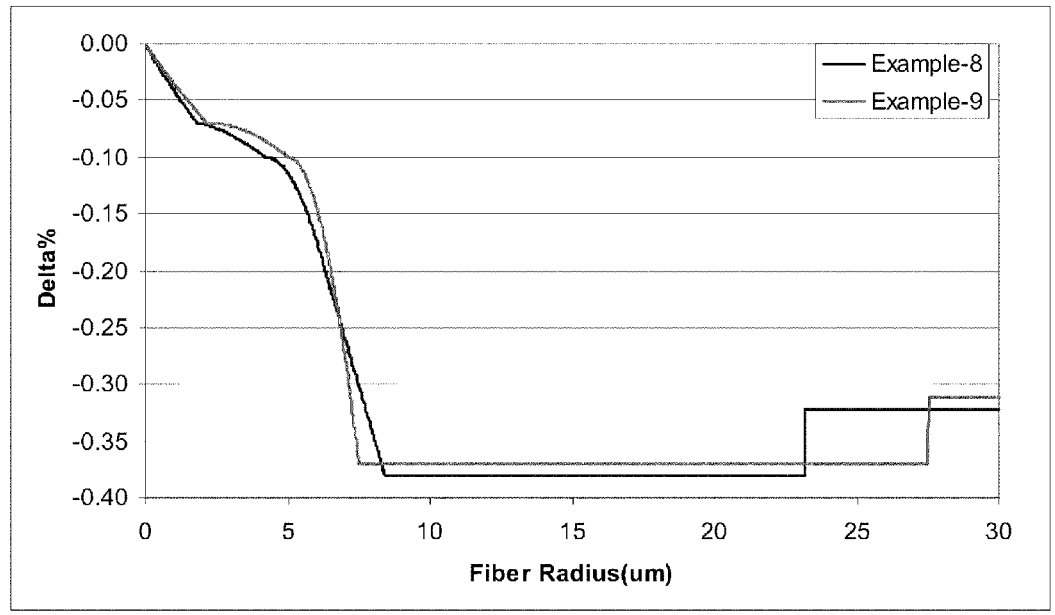

Tables 1-4 list characteristics of Examples 1-11 of an illustrative set of optical fiber embodiments as well as that of the comparative (Comp 1) fiber. The comparative fiber's profile is illustrated schematically (see dashed line) in FIG. 1B. FIGS. 2-4 show the refractive index profiles corresponding to fiber Examples 2, 6, 8 and 9, respectively. In these optical fiber embodiments of Examples 1-11, $-0.05\% \leq \Delta_{1MAX} \leq 0.12\%$ and $\Delta_2(r=2 \text{ µm}) \approx -0.05\%$; $-0.4\% \leq \Delta\Delta_{2MIN} \leq -0.25\%$; $-0.41\% \leq \Delta_{3MIN} < -0.25\%$, and $r_2/r_1$ is $3 \leq r_2/r_1 \leq 4.5$ and $r_3 < 30$ µm. In at least some embodiments $\Delta_{2MIN} = \Delta_{3MAX}$. In at least some embodiments the refractive index delta of the second annular core region 18 is relatively constant, so that $\Delta_{2MIN} = \Delta_{3MIN}$. It is also noted that in other embodiments $\Delta_2(r=2 \text{ µm})$ or $\Delta_{2MAX}$ may be between 0% and $-0.10\%$ (relative to silica), depending on the weight percent of downdopants that are present in that region. Although some embodiments of the optical fibers 10 have alpha values between 1.5 and 10, optical fiber embodiments of Examples 1-11 have alpha ($\alpha$) values less than 4, i.e. in the range of 1.8-3.

The modeled profile parameters of these exemplary fibers are summarized in Tables 1 and 2. The outer radius of the cladding 20 in these examples was 62.5 µm. Table 3 shows F amounts in different regions of these fibers. Table 4 shows modeled optical characteristics for the exemplary fibers 1-11 of Tables 1 and 2, as well as those of comparative fiber 1. It is noted that the comparative fiber (Comp. 1) has about the same effective area (118 µm²) as example 3 fiber in Table 1, and similar composition. However, the comparative fiber has a step index core region 18 ($\alpha > 10$, i.e., $\alpha = 30$) compared to the graded index core of the Example 3 fiber ($\alpha < 10$, i.e. $\alpha = 2.26$), resulting in higher attenuation.

In these eleven exemplary embodiments the cores 12 are silica based (SiO₂), and at least a portion of the cores (e.g., core regions 16, 18) are doped with fluorine. Table 3 provides fluorine, F, amounts in weight percent (wt. %) for the core regions 16, 18 and in the cladding 20, as well as the composition of core region 14. FIGS. 2 and 3 illustrate that, due to increasing amounts of F in the core region 18 of fiber examples 2 and 6, $\Delta_3$ becomes more negative as the radius increases. FIG. 4 illustrates that because F amounts are substantially constant within fiber core region 18, of fiber examples 8 and 9, $\Delta_3$ is substantially constant throughout this region. FIGS. 2-5 also illustrate that as the amount of F decreases in fiber region 16, the $\Delta_2$ values become progressively more negative, changing from $\Delta_{2MAX}$ to $\Delta_{MIN}$.

TABLE 1

| Fiber | $\Delta_{1MAX}$ | $r_1$ | $\Delta_{2MAX}$ | $\alpha$ | $r_2$ |
|---|---|---|---|---|---|
| Comp 1 | −0.015 | 2 | −0.05 | 30.00 | 6.10 |
| Ex. 1 | −0.032 | 2 | −0.04 | 2.52 | 7.15 |
| Ex. 2 | −0.024 | 2 | −0.06 | 2.26 | 7.52 |
| Ex. 3 | −0.027 | 2 | −0.08 | 2.32 | 7.71 |
| Ex. 4 | −0.062 | 2 | −0.07 | 2.49 | 7.98 |
| Ex. 5 | −0.025 | 2 | −0.05 | 2.87 | 8.08 |
| Ex. 6 | 0.016 | 2 | −0.02 | 2.53 | 8.97 |
| Ex. 7 | 0.008 | 2 | −0.03 | 2.23 | 8.93 |
| Ex. 8 | 0. | 2 | −0.07 | 2.3 | 8.4 |
| Ex. 9 | 0. | 2 | −0.06 | 2.4 | 7.6 |
| Ex. 10 | 0.025 | 2 | −0.04 | 1.80 | 7.77 |
| Ex. 11 | −0.015 | 2 | −0.05 | 30.00 | 6.10 |

TABLE 2

| Fiber | $\Delta_{2MIN} = \Delta_{3MAX}$ | $r_3$ | $\Delta_{3MIN}$ | $r_3/r_2$ | $V_3$ (%-µm²) | $\Delta_4$ |
|---|---|---|---|---|---|---|
| Comp 1 | −0.331 | 26.80 | −0.419 | 4.39 | −54.3 | −0.295 |
| Ex. 1 | −0.408 | 28.53 | −0.439 | 3.99 | −62.6 | −0.342 |
| Ex. 2 | −0.384 | 25.87 | −0.478 | 3.44 | −59.4 | −0.334 |
| Ex. 3 | −0.373 | 26.80 | −0.461 | 3.48 | −52.5 | −0.337 |
| Ex. 4 | −0.423 | 26.40 | −0.474 | 3.31 | −74.1 | −0.352 |

TABLE 2-continued

| Fiber | $\Delta_{2MIN} = \Delta_{3MAX}$ | $r_3$ | $\Delta_{3MIN}$ | $r_3/r_2$ | $V_3$ (%-µm²) | $\Delta_4$ |
|---|---|---|---|---|---|---|
| Ex. 5 | −0.372 | 28.63 | −0.417 | 3.55 | −75.3 | −0.295 |
| Ex. 6 | −0.348 | 29.02 | −0.391 | 3.24 | −87.7 | −0.254 |
| Ex. 7 | −0.345 | 28.97 | −0.425 | 3.24 | −93.2 | −0.262 |
| Ex. 8 | −0.38 | 23.18 | −0.38 | 2.76 | −27.1 | −0.322 |
| Ex. 9 | −0.37 | 27.53 | −0.37 | 3.62 | −40.6 | −0.312 |
| Ex. 10 | −0.360 | 24.80 | −0.461 | 3.19 | −69.7 | −0.285 |
| Ex. 11 | −0.331 | 26.80 | −0.419 | 3.46 | −58.1 | −0.337 |

TABLE 3

| Fiber | F, wt. % in region 16, at r = 2 µm | F, wt. % in region 18 at r = r2 | F, wt. % in region 18 at r = r3 | F, wt. % in region 20 |
|---|---|---|---|---|
| Comp 1 | 0.17 | 1.10 | 1.40 | 0.98 |
| Ex. 1 | 0.13 | 1.36 | 1.46 | 1.14 |
| Ex. 2 | 0.20 | 1.28 | 1.59 | 1.11 |
| Ex. 3 | 0.27 | 1.24 | 1.54 | 1.12 |
| Ex. 4 | 0.23 | 1.41 | 1.58 | 1.17 |
| Ex. 5 | 0.17 | 1.24 | 1.39 | 0.98 |
| Ex. 6 | 0.07 | 1.16 | 1.30 | 0.85 |
| Ex. 7 | 0.10 | 1.15 | 1.42 | 0.87 |
| Ex. 8 | 0.23 | 1.27 | 1.27 | 1.07 |
| Ex. 9 | 0.20 | 1.23 | 1.23 | 1.04 |
| Ex. 10 | 0.13 | 1.20 | 1.54 | 0.95 |
| Ex. 11 | 0.17 | 1.10 | 1.40 | 1.12 |

Note that in the optical fiber embodiments corresponding to Examples 8 and 9 (Ex. 8 and 9 of Table 1), $\Delta_{2MIN} = \Delta_{3MIN}$, and the composition of glass throughout the second annular region 18 is constant (see FIG. 4). In all of the exemplary embodiments, the optical fiber includes a moat region corresponding to the second annular core region 18. It is noted that the highest refractive index delta of the moat region (the second annular core region 18) is lower than that of the highest refractive index delta of first annular core region 16. This moat (second annular core region 18) is surrounded by the cladding 20 having refractive index $\Delta_4 22 \Delta_{3MIN}$. It is also noted that in all eleven fiber embodiments (Ex. 1-11 in Tables 1-3) the amount of F concentration in fiber core region 16 is monotonically increases monotonically with increased radius. In at least some fiber embodiments of Tables 1-3 the amount of F concentration in both fiber core region 16 and 18 is monotonically increases as radius increases. Furthermore, in at least some fiber embodiments the amount of F concentration monotonically increases throughout the core, as the radius r increases.

The volume of the second annular core region 18 (moat volume) is preferably less than −20%-µm², more preferably less than −40%-µm², and even more preferably less than −50%-µm², where the profile volume is calculated by integrating the radial-weighted difference in the index of the second annular core region with respect to the index of the cladding region:

$$V_3 = \int_{r_2}^{r_3} (\Delta_3(r) - \Delta_{4min}) r \, dr$$

A more negative profile volume is desirable for helping confine the optical power in the core, thereby minimizing microbending losses and enabling the combination of large effective area and low attenuation.

The exemplary fibers of Tables 1 and 2 have the modeled optical attributes that are listed in Table 4. Some of the embodiments of the optical fibers have the following modeled values: LP11 theoretical fiber cut-off wavelength λc between 1320 nm and 1580 nm, dispersion D at 1550 nm between 18 ps/nm/km, and 25 ps/nm/km, and more preferably between 19 ps/nm/km and 23 or 22 ps/nm/km, and attenuation at 1550 nm less than 0.170 dB/km, for example between 0.145 dB/km and 0.160 dB/km. At least some of these exemplary fibers of Tables 1-2 have an effective area $A_{eff}$ greater than 115 µm², preferably greater than 120 µm², and more preferably greater than 125 µm². The cable cutoff wavelength of these fiber embodiments is less than 1520 nm, more preferably less than 1500 nm and even more preferably less than 1450 nm. Typical attenuation of these fiber embodiments is less than 0.155 dB/km, more preferably less than 0.15 dB/km.

TABLE 4

| Example | Attn 1550, dB/km | Aeff 1550, µm² | Disp 1550, ps/nm/km | Slope 1550, ps/nm²/km | Pin Array, 1550, dB | MFD 1550 nm (µm) | $\lambda_0$ (nm) | LLWM 1550, dB | LP11, nm |
|---|---|---|---|---|---|---|---|---|---|
| 1 | 0.1531 | 118.3 | 20.60 | 0.061 | 13.1 | 12.19 | 1277 | 2.04 | 1416 |
| 2 | 0.1519 | 101.6 | 20.52 | 0.062 | 4.4 | 11.36 | 1280 | 0.48 | 1422 |
| 3 | 0.1506 | 110.0 | 20.31 | 0.062 | 9.3 | 11.89 | 1284 | 1.20 | 1403 |
| 4 | 0.1499 | 118.0 | 20.25 | 0.063 | 12.9 | 12.34 | 1285 | 2.28 | 1427 |
| 5 | 0.1507 | 114.7 | 21.06 | 0.063 | 10.1 | 12.03 | 1276 | 1.40 | 1392 |
| 6 | 0.1501 | 123.4 | 21.12 | 0.063 | 12.0 | 12.47 | 1276 | 2.46 | 1423 |
| 7 | 0.1493 | 131.8 | 21.35 | 0.064 | 12.3 | 12.9 | 1276 | 3.99 | 1449 |
| 8 | 0.1492 | 130.0 | 21.07 | 0.063 | 15.4 | 12.87 | 1278 | 4.10 | 1407 |
| 9 | 0.15 | 124.8 | 21.46 | 0.062 | 16.29 | 12.62 | 1265 | 3.85 | 1448 |
| 10 | 0.151 | 124.1 | 21.59 | 0.061 | 14.92 | 12.52 | 1261 | 3.25 | 1436 |
| 11 | 0.1496 | 125.4 | 21.07 | 0.062 | 15.67 | 12.35 | 1275 | 3.49 | 1411 |

In Table 4, the term "Slope 1550" stands for the dispersion slope in units of ps/nm²/km at 1550 nm wavelength, the term "MFD 1550" stands for mode field diameters in microns at 1550 nm wavelength and "Aeff 1550" stands for the effective area of the fiber in square microns, at 1550 nm wavelength; "Disp 1550" stands for dispersion in units of ps/nm/km at 1550 nm wavelength, "Attn 1550" stands for attenuation at 1550 nm in dB/km, and the term "Lambda 0" or "$\lambda_0$" stands for zero dispersion wavelength in nm.

Example 10 fiber has a measured Aeff of 124 µm², alpha=1.8 and its attenuation is 0.151 dB/km at 1550 nm, which is less than 0.17 dB/km.

Preferably, in fiber embodiments with an effective area greater than 115 µm², the optical fiber has a primary coating having a Young's modulus of less than 1.0 Mpa and a secondary coating having a Young's modulus of greater than 1200 Mpa. The lateral load wire mesh (LLWM) microbending loss is <5 dB, preferably <4 dB, more preferably <3 dB. The LP 11 cutoff wavelength is preferably between 1350 and 1500 nm, more preferably between 1380 and 1450 nm.

We have found that a certain combination of primary and secondary coatings remarkably improve microbend performance, and therefore overall attenuation, enabling the effective area of the fiber to be increased to ≧115 µm², preferably ≧120 µm² and even more preferably ≧130 µm². An optical fiber with effective area of at least 115 µm² preferably comprises a primary coating P that is in contact with and surrounds the cladding 20. The primary coating P has a Young's modulus of less than 1.0 MPa, preferably less than 0.9 MPa, and in preferred embodiments not more than 0.8 MPa. This optical fiber further comprises a secondary coating S contacting and surrounding the primary coating P. The secondary coating S preferably has a Young's modulus of greater than 1200 MPa, and more preferably greater than 1400 MPa.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 µm) and 0.004" (102 µm) in thickness and about 1.3 cm in width, with a gauge length of 5.1 cm, and a test speed of 2.5 cm/min.

In the exemplary embodiments the primary coating P desirably has a glass transition temperature that is lower than the lowest projected use temperature of the coated optical fiber. In some embodiments, the primary coating P has a glass transition temperature of less than −25° C., more preferably less than −30° C. Primary coating P desirably has a higher refractive index than the cladding of the optical fiber in order to allow it to strip errant optical signals away from the core of optical fiber. For example, a transmission optical fiber has refractive index values at a wavelength of 1550 nm for the core and cladding of 1.447 and 1.436, respectively; thus it is desirable that the refractive index of primary coating P be greater than 1.44 at 1550 nm. The primary coating P should maintain adequate adhesion to the glass fiber during thermal and hydrolytic aging, yet be strippable therefrom for splicing purposes. The primary coating P typically has a thickness in the range of 25-50 µm (e.g., about 32.5 µm) and can be applied to the optical fiber as a liquid and cured.

The primary coating P is preferably a cured product of a primary curable composition including an oligomer and at least one monomer. The primary curable compositions used in forming the primary coatings may also include photoinitiators.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical waveguide fiber comprising:
   (i) a Ge free core having an effective area of 100 µm² to 150 µm², at 1550 nm wavelength, said core comprising:
      (a) a central core region extending radially outwardly from a centerline to a radius $r_1$, and having a relative refractive index percent profile $\Delta_1(r)$ in % measured relative to pure silica, wherein −0.1%≦$\Delta_1(r)$≦0.12%, wherein the central core region has a maximum relative refractive index percent, $\Delta_{1MAX}$;
      (b) a first annular core region surrounding and directly adjacent to the central core region, having an α value 1.5≦α≦10, and extending to an outer radius $r_2$, wherein 6 µm≦$r_2$≦10 µm, and having a relative refractive index percent profile, $\Delta_2(r)$ in % measured relative to pure silica, a minimum relative refractive index $\Delta_{2MIN}$, a maximum relative refractive index $\Delta_{2MAX}$ and the relative refractive index measured at a radius r=2 μm, wherein $-0.45 \leq \Delta_2 \leq 0$; $-0.25 \geq \Delta_{2MIN} \geq -0.45$ and $\Delta_{1MAX} \geq \Delta_2$ (r=2 μm);

(c) a fluorine doped second annular region surrounding and directly adjacent to the first annular core region and extending to a radius 20 μm≦$r_3$≦30 μm and having a negative relative refractive index percent profile, $\Delta_3(r)$ in %, measured relative to pure silica, with a minimum relative refractive index percent $\Delta_{3MIN}$ and $-0.5\% < \Delta_{3MIN} < -0.25\%$; and $\Delta_{3MIN} \leq \Delta_{2MIN}$ (ii) a cladding surrounding the core and having a relative refractive index percent $\Delta_4(r)$ in % measured relative to pure silica and a minimum refractive index delta $\Delta_{4MIN}$, and $-0.4\% < \Delta_4 < -0.2\%$;

wherein the relative refractive index profile of the optical fiber is selected to provide attenuation of no more than 0.17 dB/km at the 1550 nm wavelength.

2. The optical waveguide fiber according to claim 1 wherein $1.5 \leq \alpha \leq 6$ and wherein the relative refractive index profile of the optical fiber is selected to provide attenuation of no more than 0.165 dB/km at the 1550 nm wavelength.

3. The optical waveguide fiber according to claim 1 wherein $-0.45\% \leq \Delta_{3MIN} \leq -0.3\%$.

4. The optical waveguide fiber according to claim 1, wherein $-0.08\% \leq \Delta_2(r=2) \leq 0.11\%$.

5. The optical waveguide fiber according to claim 1, wherein; $-0.4\% \leq \Delta_{2MIN} \leq -0.3\%$, $0.2 \leq r_2/r_3 \leq 0.4$, $r_2 \leq 10$ μm and $r_3 \leq 35$ μm.

6. The optical waveguide fiber according to claim 5, wherein $0.22 \leq r_2/r_3 \leq 0.37$ and $r_3 \leq 30$ μm.

7. The optical waveguide fiber according to claim 1, wherein said fiber is characterized by dispersion D at a wavelength of 1550 nm, and $19 \leq D \leq 23$ ps/nm/km.

8. The optical waveguide fiber according to claim 1, wherein said fiber is characterized by a zero dispersion wavelength $\lambda_0$, and 1260 nm≦$\lambda_0$≦1290 nm.

9. The optical waveguide fiber according to claim 1, wherein: (i) the effective area is between 100 μm² and 140 μm²; and (ii) the fluorine doped second annular region has between 0.1% wt % and 1.6 wt % fluorine.

10. The optical waveguide fiber according to claim 1, wherein said fiber has more than 500 ppm of fluorine in said core and more than 5000 ppm of fluorine in the cladding.

11. An optical waveguide fiber according to claim 1, wherein: (a) the central core region extends radially outwardly from a centerline to a radius 0 μm≦$r_0$≦2 μm, and having a relative refractive index percent profile $\Delta_1(r)$ in % measured relative to pure silica, (b) $\Delta_{1MAX}(r) \leq 0.11\%$; (c) the relative refractive index profile of the optical fiber is selected to provide attenuation between 0.15 dB/km and 0.16 dB/km at 1550 nm, (d) said optical waveguide fiber has dispersion D at a wavelength of 1550 nm is 20 ps/nm/km≦D≦23 ps/nm/km, 1260 nm≦$\lambda_0$≦1290 nm and macrobend loss at 1550 nm of less than 1 dB/turn on a 20 mm diameter mandrel.

12. The optical waveguide fiber according to claim 1, wherein (i) said fluorine doped second annular region has 0.1% to 1.6 wt % fluorine and (iii) said fiber has less than 1500 ppm of chlorine in the core and (iii) less than 500 ppm of chlorine in the cladding.

13. The optical waveguide fiber according to claim 1, wherein said fiber has an effective area Aeff>100 μm² and the relative refractive index profile of the optical fiber is structured to provide attenuation of no more than 0.155 dB/km at the 1550 nm wavelength.

14. The optical waveguide fiber according to claim 13, wherein (i) attenuation is no more than 0.15 dB/km at 1550 nm and (ii) the cable cut wavelength is less than 1520 nm.

15. The optical waveguide fiber according to claim 1 wherein at least a portion of the core comprises an alkali.

16. The optical waveguide fiber according to claim 15 wherein the alkali comprises Na, K, Cs, Li or Rb.

17. The optical waveguide fiber according to claim 16 wherein the alkali comprises K in the range of 20 ppm to 1000 ppm by weight.

18. The optical waveguide fiber according to claim 1, said fiber further comprising:
   a. a primary coating having a Young's modulus of less than 1.0 Mpa;
   b. a secondary coating having a Young's modulus of greater than 1200 Mpa; and
wherein said fiber has an effective area greater than 115 μm².

19. The optical waveguide fiber according to claim 18, wherein the cable cut wavelength is less than 1450 nm.

20. The optical waveguide fiber according to claim 19, wherein said fiber has an effective area Aeff>120 μm² and the relative refractive index profile of the optical fiber is structured to provide dispersion that is less than 22 ps/nm/km.

\* \* \* \* \*